United States Patent
Roth et al.

(10) Patent No.: US 8,577,681 B2
(45) Date of Patent: Nov. 5, 2013

(54) PRONUNCIATION DISCOVERY FOR SPOKEN WORDS

(75) Inventors: Daniel L. Roth, Boston, MA (US);
Laurence S. Gillick, Newton, MA (US);
Mike Shire, Cambridge, MA (US)

(73) Assignee: Nuance Communications, Inc., Burlington, MA (US)

( * ) Notice: Subject to any disclaimer, the term of this patent is extended or adjusted under 35 U.S.C. 154(b) by 2916 days.

(21) Appl. No.: 10/939,942

(22) Filed: Sep. 13, 2004

(65) Prior Publication Data

US 2005/0143970 A1   Jun. 30, 2005

Related U.S. Application Data

(60) Provisional application No. 60/502,084, filed on Sep. 11, 2003.

(51) Int. Cl.
*G10L 15/06* (2013.01)
*G10L 15/00* (2013.01)

(52) U.S. Cl.
USPC ............ 704/244; 704/243; 704/251; 704/254

(58) Field of Classification Search
USPC .................................. 704/243–244, 251, 254
See application file for complete search history.

(56) References Cited

U.S. PATENT DOCUMENTS

| | | | |
|---|---|---|---|
| 5,369,727 A | 11/1994 | Nomura et al. | |
| 5,680,511 A | 10/1997 | Baker et al. | |
| 5,712,957 A | 1/1998 | Waibel et al. | |
| 5,805,772 A | 9/1998 | Chou et al. | |
| 5,822,728 A | 10/1998 | Applebaum et al. | |
| 5,829,000 A | 10/1998 | Huang et al. | |
| 5,855,000 A | 12/1998 | Waibel et al. | |
| 5,875,425 A | 2/1999 | Nakamura et al. | |
| 5,933,804 A * | 8/1999 | Huang et al. | 704/244 |
| 5,950,160 A | 9/1999 | Rozak | |
| 5,987,409 A | 11/1999 | Tran et al. | |
| 6,064,959 A * | 5/2000 | Young et al. | 704/251 |
| 6,076,053 A * | 6/2000 | Juang et al. | 704/236 |
| 6,137,863 A | 10/2000 | Brown et al. | |
| 6,192,337 B1 * | 2/2001 | Ittycheriah et al. | 704/231 |
| 6,233,553 B1 * | 5/2001 | Contolini et al. | 704/220 |
| 6,243,680 B1 | 6/2001 | Gupta et al. | |
| 6,363,342 B2 * | 3/2002 | Shaw et al. | 704/220 |
| 6,363,347 B1 | 3/2002 | Rozak | |
| 6,389,394 B1 | 5/2002 | Fanty | |
| 6,418,328 B1 | 7/2002 | Shon et al. | |
| 6,754,625 B2 | 6/2004 | Olsen et al. | |
| 6,760,702 B2 | 7/2004 | Chien et al. | |
| 6,766,069 B1 | 7/2004 | Dance et al. | |
| 6,801,893 B1 * | 10/2004 | Backfried et al. | 704/257 |

(Continued)

FOREIGN PATENT DOCUMENTS

EP    0 984 430 A2    3/2000

*Primary Examiner* — James Wozniak
(74) *Attorney, Agent, or Firm* — Sunstein Kann Murphy & Timbers LLP (57) ABSTRACT

A method of generating an alternative pronunciation for a word or phrase, given an initial pronunciation and a spoken example of the word or phrase, includes providing the initial pronunciation of the word or phrase, and generating the alternative pronunciation by searching a neighborhood of pronunciations about the initial pronunciation via a constrained hypothesis, wherein the neighborhood includes pronunciations that differ from the initial pronunciation by at most one phoneme. The method further includes selecting a highest scoring pronunciation within the neighborhood of pronunciations.

30 Claims, 4 Drawing Sheets

(56) References Cited

U.S. PATENT DOCUMENTS

| | | |
|---|---|---|
| 6,910,012 B2 | 6/2005 | Hartley et al. |
| 6,963,841 B2 * | 11/2005 | Handal et al. .................. 704/270 |
| 7,089,188 B2 * | 8/2006 | Logan et al. .................. 704/270 |
| 7,099,828 B2 * | 8/2006 | Kobal et al. .................... 704/270 |
| 7,113,908 B2 * | 9/2006 | Goronzy et al. .............. 704/244 |
| 7,149,970 B1 | 12/2006 | Pratley et al. |
| 7,266,495 B1 * | 9/2007 | Beaufays et al. ............. 704/236 |
| 2002/0052742 A1 | 5/2002 | Thrasher et al. |
| 2002/0120447 A1 * | 8/2002 | Charlesworth et al. ....... 704/254 |
| 2002/0184019 A1 | 12/2002 | Hartley et al. |
| 2004/0049388 A1 | 3/2004 | Roth et al. |
| 2005/0043949 A1 | 2/2005 | Roth et al. |

* cited by examiner

PRONUNCIATION DISCOVERY FOR SPOKEN WORDS

CROSS-REFERENCE TO RELATED APPLICATIONS

This application claims benefit U.S. Provisional Patent Application Ser. No. 60/502,084, filed Sep. 11, 2003.

TECHNICAL FIELD

This invention relates generally to wireless communication devices with speech recognition capabilities.

BACKGROUND

Wireless communications devices, such as cellular telephones (cell phones), commonly employ speech recognition tools to simplify the user interface. For example, many cell phones can recognize and execute user commands to initiate an outgoing phone call, or answer an incoming phone call. Many cell phones can recognize a spoken name from a phone book, and automatically initiate a phone call to the number associated with the spoken name.

Handheld electronic devices (e.g., mobile phones, PDAs, etc., referred to herein as "handhelds") typically provide for user input via a keypad or similar interface, through which the user manually enters commands and/or alphanumeric data. Manually entering information may require the user to divert his attention from other important activities such as driving. One solution to this problem is to equip the handheld with an embedded speech recognizer.

Due to numerous factors, the speech recognizer may occasionally incorrectly decode the utterance from the user. To deal with such errors, some speech recognizers generate a list of N alternatives for the recognized transcript (i.e., the word or words corresponding to what the user uttered), referred to herein as the choice list (also known in the art as an N-best list), from which the user may choose the correct version. One factor contributing to incorrect recognitions that is particularly relevant in the following description is variations in user pronunciation. A user with a certain dialect or accent may utter a word that does not score well with the phonetic representation of that word stored in the lexicon of the speech recognizer.

SUMMARY OF THE INVENTION

The described embodiment generates an alternative phonetic representation (i.e., alternative pronunciation) of an initial pronunciation of a word (or phrase). In general, the initial pronunciation of the word is not the highest-scoring word provided by the speech recognizer, but is rather a word chosen by the user from an N-best list of alternatives or entered manually. The alternative phonetic representation is then stored as either a replacement for, or in addition to, the existing phonetic representation in the phonetic lexicon.

In the described embodiment, a speech recognizer processes an utterance from a user and generates a recognized transcript, along with an N-best list of alternatives. For an initial transcript, the user chooses one of the alternatives to the recognized transcript, or enters an alternative transcript manually (if the correct transcript is not available from the speech recognizer). The speech recognizer is constrained to recognize a hypothesis that differs from the initial transcript by no more than one phoneme. The score of this hypothesis thus represents the best scoring alternate pronunciation with respect to the utterance, that is different from the initial pronunciation by at most one phoneme. If the score of this alternate pronunciation is higher (by some threshold) than that of the initial pronunciation by some threshold, the speech recognizer updates its lexicon by replacing the initial pronunciation currently in the lexicon with the alternate pronunciation. Alternatively, instead of replacing the pronunciation, the speech recognizer may add the new pronunciation, so that both pronunciations are in the lexicon.

If the score of the new pronunciation is not higher (by some threshold) than the score of the initial pronunciation by more than some threshold, the speech recognizer does not update its lexicon.

In one aspect, a method of generating an alternative pronunciation for a word or phrase given an initial pronunciation and a spoken example of the word or phrase includes providing the initial pronunciation of the word or phrase, generating the alternative pronunciation by searching a neighborhood of pronunciations about the initial pronunciation, and selecting a highest scoring pronunciation within the neighborhood of pronunciations. The neighborhood may include pronunciations that differ from the neighborhood by some limited number or amount of speech sub-units, such as phonemes, syllables, diphones, triphones, or other such sub-units of speech known in the art.

The method includes searching the neighborhood of pronunciations that differ from the initial pronunciation by at most one phoneme, for example by using a speech recognition system to perform phoneme recognition with a constraint.

The method further includes using a phonetic recognizer to associate a score with each of the inital and/or the alternative pronunciations, and using one or both of these scores to decide whether to add the new pronunciation to the lexicon.

The method includes updating the associated lexicon by replacing the initial pronunciation in the lexicon with the highest-scoring alternative pronunciation, or by augmenting the lexicon by adding the alternative pronunciation. The user may have an option of allowing or disallowing the update of the lexicon.

In another aspect, a method of generating an alternative pronunciation of a initial pronunciation includes generating an initial pronunciation corresponding to a spoken utterance, generating one or more potential alternative pronunciations by changing the initial pronunciation by one phoneme, and selecting a highest scoring potential alternative pronunciation with respect to the spoken utterance as the alternative pronunciation of the initial pronunciation.

In another aspect, a computer readable medium with stored instructions adapted for generating an alternative pronunciation of a initial pronunciation includes instructions for generating an initial pronunciation corresponding to a spoken utterance. The medium further includes instructions for generating one or more potential alternative pronunciations by changing the initial pronunciation by one phoneme, and instructions for selecting a highest scoring potential alternative pronunciation with respect to the spoken utterance as the alternative pronunciation of the initial pronunciation.

In another aspect, a method of updating a lexicon used by a speech recognizer includes selecting a phonetic representation of a spoken utterance, generating a set of alternate phonetic representations by changing one or more phonemes in the phonetic representation, and scoring the set of alternate phonetic representations as to how well each one matches the spoken utterance, so as to produce a highest-scoring phonetic representation. The method further includes updating the lexicon with the highest scoring phonetic representation.

In another aspect, a method of generating an alternative pronunciation for a word or phrase given an initial pronunciation and a spoken example of the word or phrase includes providing the initial pronunciation of the word or phrase. The method further includes generating the alternative pronunciation by searching a neighborhood of pronunciations about the initial pronunciation via a constrained search. The neighborhood includes pronunciations that differ from the initial pronunciation by at most one phoneme. The method also includes selecting a highest scoring pronunciation within the neighborhood of pronunciations.

In another aspect, a method of generating an alternative pronunciation of an initial pronunciation includes generating an initial pronunciation corresponding to a spoken utterance, generating one or more potential alternative pronunciations by constructing one or more hypotheses constrained so as to match the initial pronunciation except for phoneme, and selecting a highest scoring potential alternative pronunciation with respect to the spoken utterance as the alternative pronunciation of the initial pronunciation.

DESCRIPTION OF THE PREFERRED EMBODIMENTS

The described embodiment is a cell phone with embedded speech recognition functionality that allows a user to bypass the manual keypad and enter commands and data via spoken words. Embedded application software in the cellular telephone provides the speech recognition functionality (also referred to a speech recognizer). The speech recognizer includes a process for updating its phonetic lexicon to better match a user's pronunciation.

When the user utters a word or phrase, the speech recognizer searches a lexicon of phonetic representations for the highest scoring match of the acoustic utterance, and provides a recognized transcript corresponding to that highest scoring phonetic representation. The speech recognizer also provides the user with a list of alternatives to the recognized transcript (i.e., the N-best list). The N-best list corresponds to the next N highest scoring phonetic representations (with respect to the utterance) in the lexicon.

If the user selects an alterative from the N-best list instead of the recognized transcript, or if the user manually enters an alternative because the correct choice is not available in the recognized transcript or the N-best list, the speech recognizer may update its phonetic lexicon with an alternative pronunciation that is within a neighborhood of the alternative transcript (referred to herein as the "initial transcript") chosen by the user.

The speech recognizer searches the space of all pronunciations that differ from the initial pronunciation by no more than one phoneme. If the score of the pronunciation output by the speech recognizer is greater than the score of the initial pronunciation (by a predetermined threshold), the speech recognizer updates the lexicon with the new pronunciation. The particular value of the threshold is selected to result in desired performance without changing the lexicon for insignificant variations of pronunciation. The threshold thus allows for filtering small pronunciation changes that do not provide a beneficial impact. Updating the lexicon includes replacing the initial pronunciation. Updating the lexicon may alternatively include augmenting the lexicon with the new pronunciation, without removing or otherwise replacing the initial pronunciation.

Figure 1:
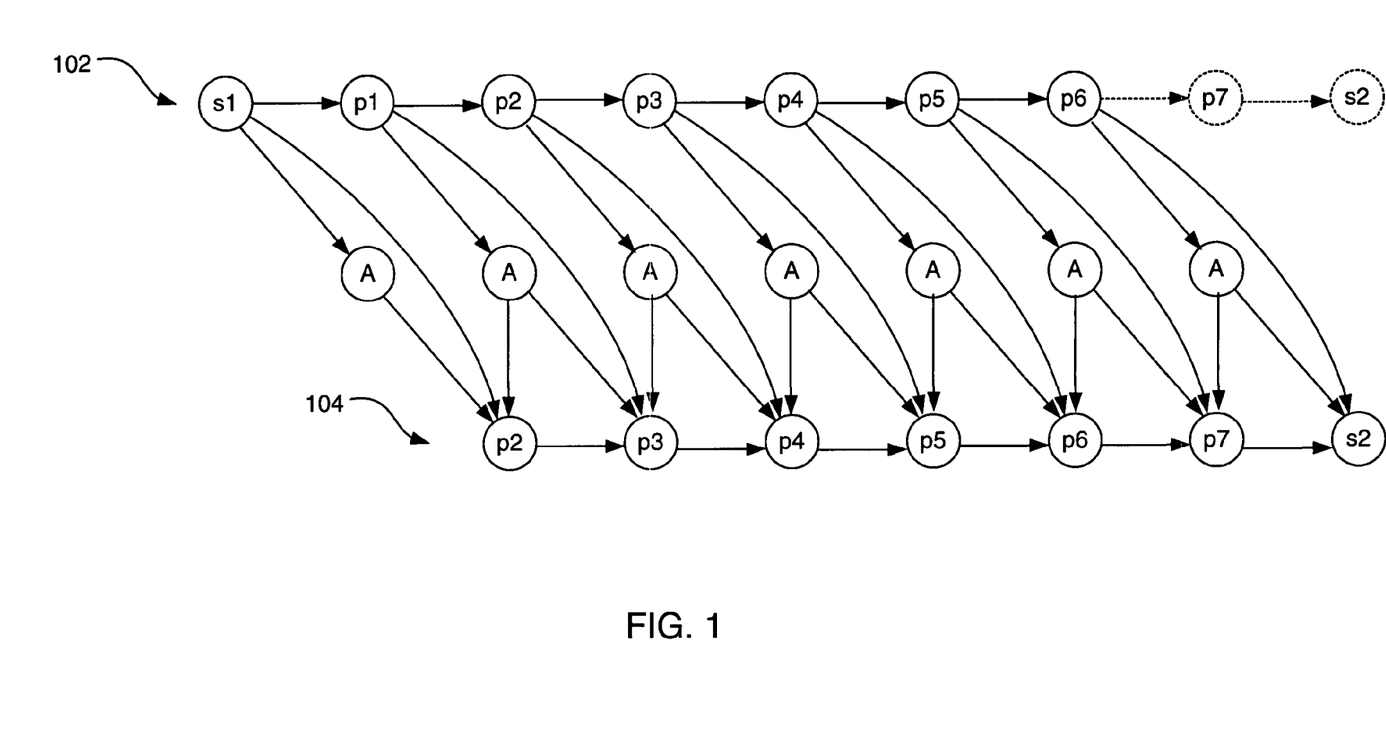
FIG. 1 shows a constraint (finite-state machine) used in phoneme recognition to find the best-scoring pronunciation that differs from the original pronunciation by at most one phoneme.
Figure 2A:
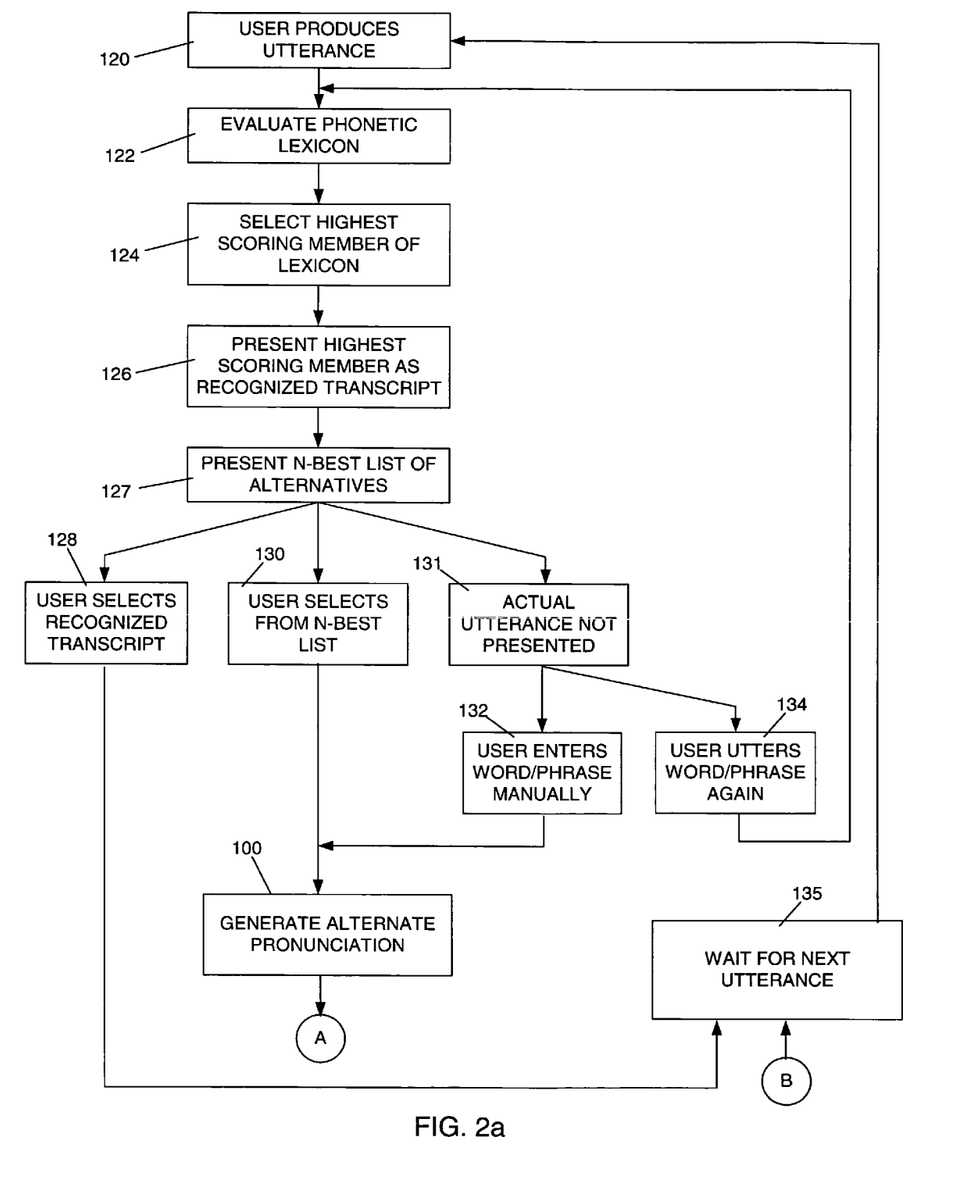
FIGS. 2a and 2b show, in flow diagram form, the operation of the described embodiment.
Figure 2B:
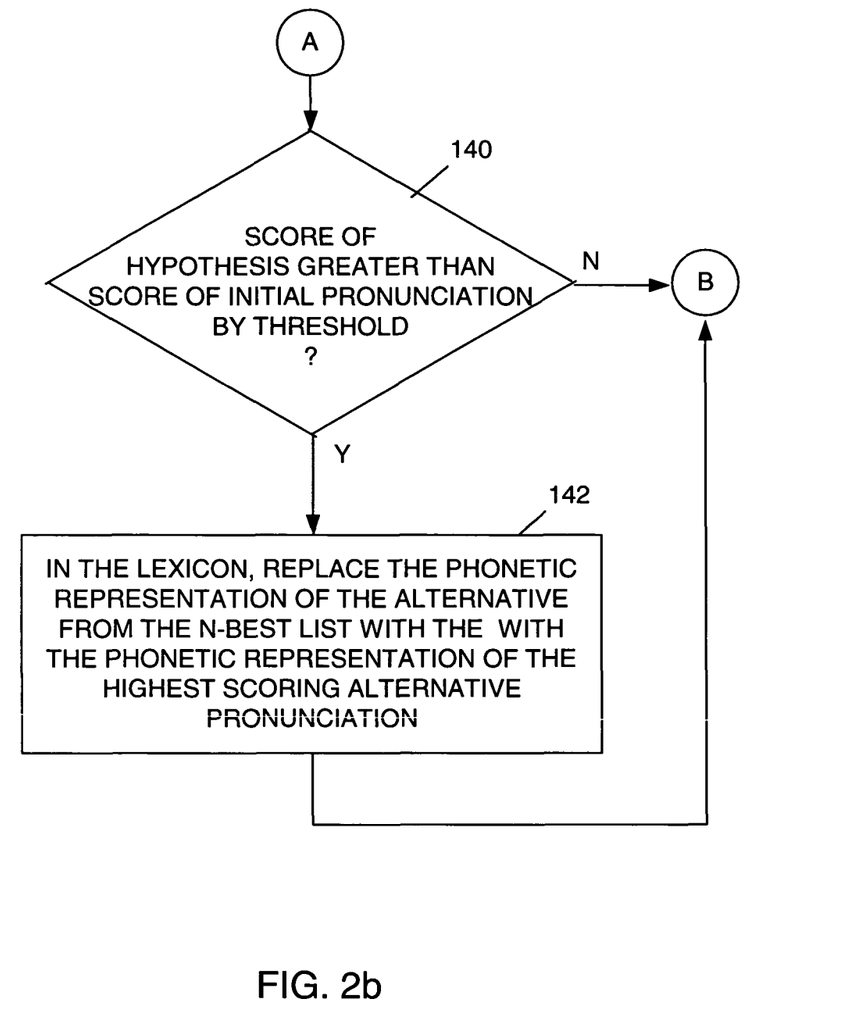

FIGS. 1, 2a, and 2b show flow diagrams describing how the described embodiment updates its lexicon as generally set forth above. We then present a description of a typical cell phone system in which the general functionality can be implemented.

In the most general sense, each of the embodiments described herein takes an utterance, i.e., a spoken example of a word or phrase, along with an initial pronunciation of that utterance (e.g., a pronunciation corresponding to a recognized transcript or an alternative to that transcript, or some other source of a pronunciation), and generates an alternative pronunciation that is within a "neighborhood" of the initial pronunciation. In the described embodiment, this neighborhood is defined by a variation in the phonemes of the initial pronunciation (e.g., one phoneme different), but in general the neighborhood could be defined by any variation of the initial pronunciation that changes how well the changed pronunciation matches the utterance. Any pronunciation sub-unit, e.g., syllables, diphones, triphones, etc., as an alternative to phonemes, may be used to define these variations. Further, the neighborhood could be defined by a combination of such variations. Also in this embodiment the initial pronunciation comes from a cell phone user's choice of an alternative recognized transcript, but in general the initial pronunciation could come from other sources. The concepts described herein merely require an initial pronunciation and a corresponding spoken example of that pronunciation. For a cell phone with a phonetic lexicon, all that is required is a spoken example of a word or phrase and a spelling of that word or phrase that can be used to find a pronunciation in the lexicon.

FIG. 1 shows the constraint (finite-state machine) used in the phoneme recognition including a first row 102 of states with the states constrained to phonemes $p_1$ through $p_7$ as shown, and an initial silence state $s_1$ and a final silence state $s_2$. The phonemes $p_1$ through $p_7$ represent the initial pronunciation described above. Below the first row of states 102 is a second row of states 104, which is essentially a duplicate of the initial pronunciation states in the first row 102 starting with the second phoneme. Between the first row 102 and the second row 104 are a number of "any phoneme" states (A) that can take on any particular phoneme identity. Potential transition paths are shown with arrowed lines. The first row thus represents the sequence of phonemes in the initial pronunciation with no changes, and the second row 104 represents the sequence of phonemes with one phoneme different. In the second row 104, where a node has more than one input, the recognizer chooses the highest scoring input, i.e., the path that best matches the spoken utterance. Possible hypothesis paths into the $n^{th}$ node of the second row 104 include (i) the $(n-1)^{th}$ state of the second row 104, (ii) the $(n-1)^{th}$ "any phoneme" state, so that a different phoneme replaces the $(n-1)^{th}$ phoneme the initial pronunciation, (iii) the $(n-2)^{th}$ phoneme of the initial pronunciation, effectively deleting the previous phoneme, or (iv) the $n^{th}$ "any phoneme" state, thereby inserting an additional phoneme into the hypothesis.

With this architecture, regardless of the path taken from the initial silence $s_1$ to the end of the second row 104, the recognized hypothesis will include at most one phoneme change (substitution, insertion, or deletion), and will represent the highest scoring hypothesis with at most one phoneme different. The score at $s_2$ therefore corresponds to the best scoring pronunciation with at most one phoneme different from the initial pronunciation, which is used as the alterative pronunciation. States $p_7$ and $s_2$ are shown in broken lines, because they have no input to the second row 104 result. In the preferred embodiment, insertions are excluded at the beginning and end of the utterance.

The process for updating the speech recognizer lexicon in the described embodiment is shown in FIGS. 2a and 2b. The process begins when the user utters a word or phrase 120 (i.e., an utterance). The speech recognizer evaluates 122 its phonetic lexicon of standard pronunciations with respect to the utterance using a phonetic recognizer, and selects 124 the highest-scoring member. The speech recognizer presents 126 the highest scoring member to the user as the recognized transcript, and also presents 127 the next N highest scoring members as an N-best list of alternatives to the recognized transcript.

The user typically selects either (i) the recognized transcript 128 or (ii) one of the members of the N-best list 130 of alternatives, as what he actually uttered. However in some cases, neither the recognized transcript nor the N-best list includes 131 what the user actually uttered. In those cases, the user may either enter the word/phrase manually 132, effectively bypassing the speech recognition functionality, or simply utter 134 the word or phrase again.

If the user selects the recognized transcript 128, the speech processor does not update its lexicon, and waits for the next utterance. If the user selects an alternative from the N-best list 130 or manually enters the word/phrase, the speech recognizer generates 100 an alternative pronunciation from the initial pronunciation as described above.

The speech recognizer compares the score of the user's alternative (i.e., the initial pronunciation) to the score of the alternate pronunciation. If 140 the score of the alternate pronunciation is greater than the score of the initial pronunciation by a threshold, the speech recognizer replaces 142 the phonetic representation of the initial pronunciation in the lexicon with the alternative pronunciation generated 100 by the speech recognizer.

Updating the lexicon to replace the initial pronunciation as described above removes that initial phonetic representation from future consideration by the speech processor. Other users of the cell phone, however, may pronounce words in such a way that would produce a better score on the original phonetic representation that was replaced than on the updated phonetic representation. Therefore another way to update the lexicon in the above-described procedure is to add the highest scoring phonetic representation to the lexicon without eliminating the original pronunciation, so that both pronunciations are included in the lexicon for future consideration by the speech processor.

In either case of updating the lexicon (i.e., by replacement or augmentation), the cell phone may provide the user with the option of whether or not to allow update. This option may be on a case-by-case basis, so that each time a potential update is available, the user may affirmatively allow or disallow the update via a keystroke or spoken command. This option can also be selected as an enable/disable function, so that the all updates are allowed when the user enables the function, and all updates are disallowed when the user disables the function.

The speech recognizer may be able to further improve the pronunciation through an iterative process. For example, if the score of the alternative pronunciation is better than the initial pronunciation by a predetermined threshold, the speech recognizer generates yet another pronunciation by taking the previously determined alternative pronunciation and finding a new, higher-scoring alternative pronunciation that differs from the previously determined alternative pronunciation by only one phoneme. This iterative process continues until the improvement drops below the predetermined threshold, indicating that the improvement is leveling off.

Figure 3:
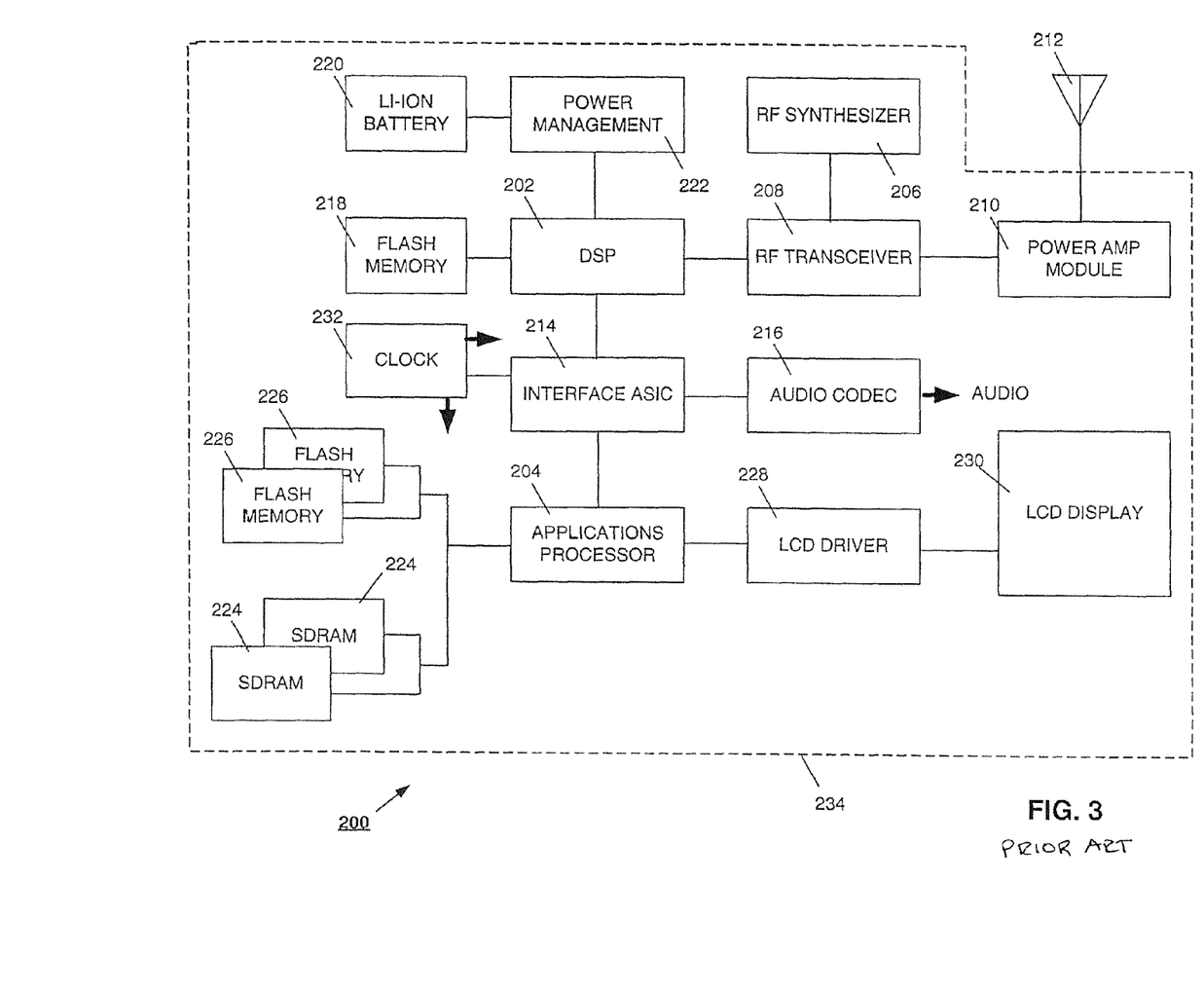
FIG. 3 shows a high-level block diagram of a smartphone.

A smartphone 200, as shown in FIG. 3, is a typical platform that can provide such speech recognition functionality via embedded application software. In fact, the described method of updating the phonetic lexicon may also be implemented in other portable phones, and in other hand held devices in general.

Smartphone 200 is a Microsoft PocketPC-powered phone which includes at its core a baseband DSP 202 (digital signal processor) for handling the cellular communication functions (including for example voiceband and channel coding functions) and an applications processor 204 (e.g. Intel StrongArm SA-110) on which the PocketPC operating system runs. The phone supports GSM voice calls, SMS (Short Messaging Service) text messaging, wireless email, and desktop-like web browsing along with more traditional PDA features.

An RF synthesizer 206 and an RF radio transceiver 208, followed by a power amplifier module 210, implement the transmit and receive functions. The power amplifier module handles the final-stage RF transmit duties through an antenna 212. An interface ASIC 214 and an audio CODEC 216 provide interfaces to a speaker, a microphone, and other input/output devices provided in the phone such as a numeric or alphanumeric keypad (not shown) for entering commands and information.

DSP 202 uses a flash memory 218 for code store. A Li-Ion (lithium-ion) battery 220 powers the phone and a power management module 222 coupled to DSP 202 manages power consumption within the phone. SDRAM 224 and flash memory 226 provide volatile and non-volatile memory, respectively, for applications processor 214. This arrangement of memory holds the code for the operating system, the code for customizable features such as the phone directory, and the code for any embedded applications software in the smartphone, including the voice recognition software described above. The visual display device for the smartphone includes LCD driver chip 228 that drives LCD display 230. Clock module 232 provides the clock signals for the other devices within the phone and provides an indicator of real time. All of the above-described components are packages within an appropriately designed housing 234.

Smartphone 200 described above represents the general internal structure of a number of different commercially available smartphones, and the internal circuit design of those phones is generally known in the art.

In the described embodiment, an application running on the applications processor 104 performs the process of updating the phonetic lexicon as described in FIGS. 1, 2a, and 2b.

Other aspects, modifications, and embodiments are within the scope of the following claims.

What is claimed is:

1. A method comprising:
providing a lexicon;
receiving a spoken utterance of a word or phrase;
after receiving the spoken utterance, obtaining an initial pronunciation for the spoken utterance;
after obtaining the initial pronunciation, modifying the initial pronunciation to generate a plurality of alternative pronunciations;
using the received spoken utterance to score each of the pronunciations among the plurality of alternative pronunciations;

identifying a highest scoring pronunciation among the plurality of alternative pronunciations; and updating the lexicon with the highest scoring pronunciation.

2. The method of claim 1, wherein the plurality of alternative pronunciations differ from the initial pronunciation in a limited number of phonemes.

3. The method of claim 1, wherein the plurality of alternative pronunciations differ from the initial pronunciation by at most one phoneme.

4. The method of claim 1, wherein obtaining the initial pronunciation involves accepting a recognized transcript from a speech recognizer.

5. The method of claim 1, wherein obtaining the initial pronunciation involves accepting a user selection of a recognized transcript.

6. The method of claim 1, wherein obtaining the initial pronunciation involves accepting a user selection from a list of alternatives to a recognized transcript.

7. The method of claim 1, further comprising using a phonetic recognizer to compute a score for each of the alternative pronunciation and/or the initial pronunciation, and using one or both of these scores to decide whether to add the alternative pronunciation to a lexicon.

8. The method of claim 1, wherein updating a lexicon by replacing another pronunciation with the highest-scoring alternative pronunciation.

9. The method of claim 8, further comprising providing a user with an option of allowing or disallowing the update of the lexicon.

10. The method of claim 1, wherein the lexicon is a phonetic lexicon.

11. The method of claim 10, further comprising:

using the phonetic lexicon to perform recognition on the spoken utterance to generate a recognized transcript of the spoken utterance, said recognized transcript being characterized by a corresponding pronunciation; and generating an N-best list of alternatives to the recognized transcript, each alternative of that N-best list of alternatives having a corresponding pronunciation, wherein the initial pronunciation is selected from the N-best list of alternatives.

12. The method of claim 11, wherein said recognized transcript has a score and wherein updating the lexicon involves first determining that the highest scoring pronunciation among the plurality of alternative pronunciations has a score that is higher than the score of the pronunciation for the recognized transcript and then adding the highest scoring pronunciation to the lexicon.

13. The method of claim 12, wherein updating the lexicon also involves deleting said corresponding pronunciation for the recognized transcript.

14. The method of claim 1, further comprising using the lexicon to perform recognition on the spoken utterance to generate a recognized transcript of the spoken utterance, said recognized transcript being characterized by a corresponding pronunciation, and wherein the initial pronunciation is different from said corresponding pronunciation for the recognized transcript.

15. The method of claim 7, wherein the lexicon is a phonetic lexicon.

16. The method of claim 15, further comprising:

using the phonetic lexicon to perform recognition on the spoken utterance to generate a recognized transcript of the spoken utterance, said recognized transcript being characterized by a corresponding pronunciation; and generating an N-best list of alternatives to the recognized transcript, each alternative of that N-best list of alternatives having a corresponding pronunciation, wherein the initial pronunciation is selected from the N-best list of alternatives.

17. The method of claim 16, wherein said recognized transcript has a score and wherein updating the lexicon involves first determining that the highest scoring pronunciation among the plurality of alternative pronunciations has a score that is higher than the score of the pronunciation for the recognized transcript and then adding the highest scoring pronunciation to the lexicon.

18. The method of claim 17, wherein updating the lexicon also involves deleting said corresponding pronunciation for the recognized transcript.

19. The method of claim 7, further comprising using the lexicon to perform recognition on the spoken utterance to generate a recognized transcript of the spoken utterance, said recognized transcript being characterized by a corresponding pronunciation, and wherein the initial pronunciation is different from said corresponding pronunciation for the recognized transcript.

20. A method comprising:

providing a lexicon;

receiving a spoken utterance of a word or phrase;

after receiving the spoken utterance, obtaining an initial pronunciation for the spoken utterance;

after obtaining the initial pronunciation, modifying the initial pronunciation to generate a plurality of alternative pronunciations by changing the initial pronunciation by one phoneme;

identifying a highest scoring pronunciation among the plurality of alternative pronunciations; and updating the lexicon with the highest scoring pronunciation.

21. A non-transitory computer readable medium storing executable instructions which when executed on a computer system cause the computer system to:

receive a spoken utterance of a word or phrase;

after receiving the spoken utterance, obtain an initial pronunciation for the spoken utterance;

after obtaining the initial pronunciation, modify the initial pronunciation to generate a plurality of alternative pronunciations by changing the initial pronunciation by one phoneme; and use the received spoken utterance to score each of the pronunciations among the plurality of alternative pronunciations;

identify a highest scoring pronunciation among the plurality of alternative pronunciations: and update a lexicon with the highest scoring pronunciation.

22. The computer readable medium of claim 21, wherein the stored executable instructions when executed on the computer system cause the computer system to obtain the initial pronunciation by accepting a user selection of a recognized transcript.

23. The computer readable medium of claim 21, wherein the stored executable instructions when executed on the computer system also cause the computer system to present a user with a list of alternatives to a recognized transcript and to accept a user selection from the list of alternatives as the initial pronunciation.

24. The computer readable medium of claim 21, wherein the stored executable instructions when executed on the computer system also cause the computer system to implement a phonetic recognizer which computes a score for each of the alternative pronunciations.

25. The computer readable medium of claim 21, wherein the stored executable instructions when executed on the computer system also cause the computer system to update the lexicon by replacing a stored phonetic representation with the highest-scoring potential alternative pronunciation.

26. The computer readable medium of claim 21, wherein the lexicon is a phonetic lexicon.

27. The computer readable medium of claim 26, wherein the stored executable instructions when executed on the computer system also cause the computer system to:
  use the phonetic lexicon to perform recognition on the spoken utterance to generate a recognized transcript of the spoken utterance, said recognized transcript being characterized by a corresponding pronunciation; and
  generate an N-best list of alternatives to the recognized transcript, each alternative of that N-best list of alternatives having a corresponding pronunciation,
  wherein the initial pronunciation is selected from the N-best list of alternatives.

28. The computer readable medium of claim 27, wherein said recognized transcript has a score and wherein the stored executable instructions when executed on the computer system also cause the computer system to update the lexicon by first determining that the highest scoring pronunciation among the plurality of alternative pronunciations has a score that is higher than the score of the pronunciation for the recognized transcript and then adding the highest scoring pronunciation to the lexicon.

29. The computer readable medium of claim 28, wherein the stored executable instructions when executed on the computer system also cause the computer system to update the lexicon by deleting said corresponding pronunciation for the recognized transcript.

30. The computer readable medium of claim 21, wherein the stored executable instructions when executed on the computer system also cause the computer system to use the lexicon to perform recognition on the spoken utterance to generate a recognized transcript of the spoken utterance, said recognized transcript being characterized by a corresponding pronunciation, and wherein the initial pronunciation is different from said corresponding pronunciation for the recognized transcript.

* * * * *